No. 866,134.

W. H. HOFFMANN.
TIRE PROTECTOR.
APPLICATION FILED NOV. 18, 1905.

PATENTED SEPT. 17, 1907.

Attest:

Inventor:
W. H. Hoffmann
by Oscar Gung, his Atty.

UNITED STATES PATENT OFFICE.

WILLIAM H. HOFFMANN, OF NEW YORK, N. Y.

TIRE-PROTECTOR.

No. 866,134.  Specification of Letters Patent.  Patented Sept. 17, 1907.

Application filed November 18, 1905. Serial No. 287,981.

*To all whom it may concern:*

Be it known that I, WILLIAM H. HOFFMANN, a citizen of the United States, residing at the city of New York, borough of Manhattan, county and State of New York, have invented certain new and useful Improvements in Tire-Protectors, of which the following is a specification.

The object of my invention is to provide a new and improved tire protector, especially adapted for pneumatic or other yielding tires, such as are used on automobiles, motor cars, and like vehicles, which tire protector is simple in construction, strong and durable, can easily be applied or removed and repaired, is held in place firmly and securely and does not cut into the yielding tire, prevents cutting and puncturing of the tire and also gives a firm grip on the road and prevents skidding.

In the accompanying drawings, in which like letters of reference indicate like parts in all the figures:—

Figure 1:
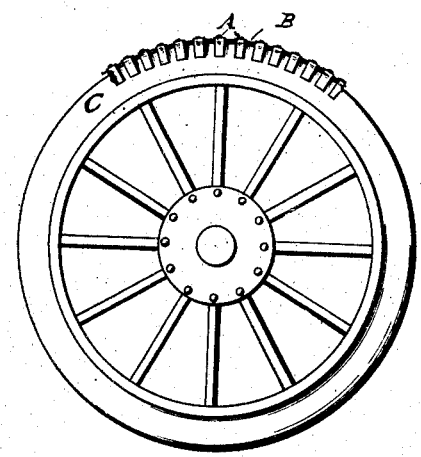
Figure 2:
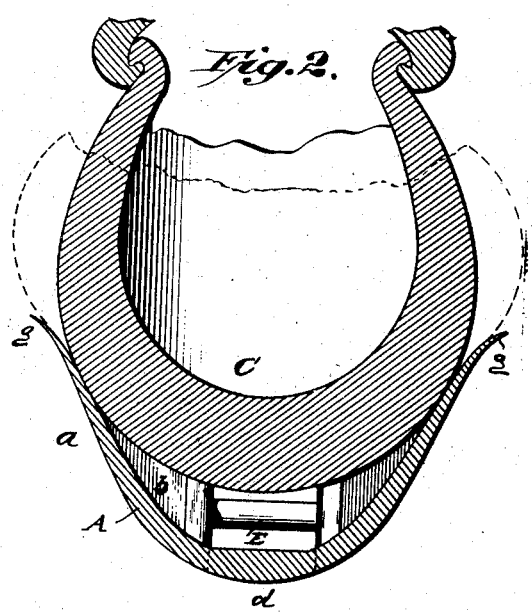
Figure 3:
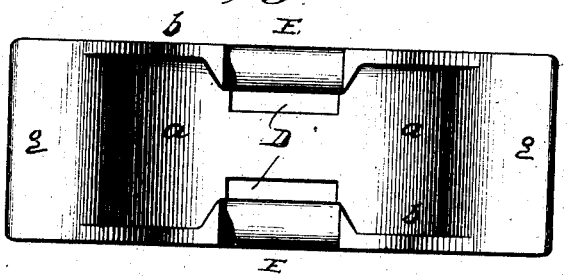
Figure 4:
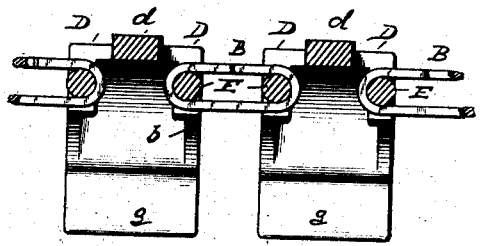
Figure 5:
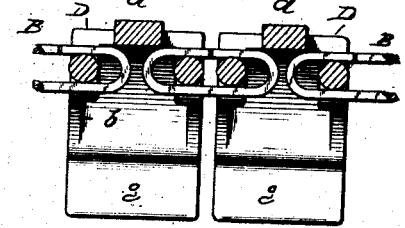

Figure 1 is a side view of the tire showing part of my improved protector on part of the tire. Fig. 2 is a longitudinal sectional view through one of the shoe sections. Fig. 3 is a plan view of the inner face of one of the sections. Fig. 4 is a transverse sectional view through two of the sections with the uniting links extended. Fig. 5 is a similar view with the shoe sections in contact and the links pushed into the sections.

My improved tire protector is composed of a series of substantially V shaped metal shoes or shoe sections A which are united by links B to form an endless chain, which surrounds the tire C so that when this tire is inflated and expanded, its outer portions are forced in between the shanks of the shoe sections A and cause the endless chain to stretch to its utmost capacity whereby it is held taut firmly and securely on the tire.

As will be seen from the drawing, each shoe section A is provided with two diverging shanks $a$ each of which is provided at its side edge with a flange $b$, gradually decreasing in height from the center of the section toward the ends of the shanks, the tread or bearing surface of the shoe marked $d$, being along the apex of the shoe.

At each side a notch D is cut out of each shoe section and a pivot pin E is formed transversely across this notch along the side edge of the shoe, that is, substantially in line with the flanges $b$.

The links B for uniting the shoes are preferably composed of flat steel bands bent in the form of a link and the ends of which are passed through the recesses D and around the pivot pins E and then the free ends of the links are pressed down to close the links. It will be seen that the pivot pins E are some distance inward from the tread parts $d$ of the shoe sections so that the links can slide lengthwise of the chain of shoe sections and in so sliding pass in under the tread part proper $d$ of the shoes, and as the tire is expanded and the chain lengthened, these links pass out from under the tread part proper $d$ of the shoe sections until the entire chain is taut.

As shown in full lines, in Fig. 2, the tire C rests upon the inner surface of the shoe and as the tire expands under the load it rests against the inner surface of the extreme end portions $g$ of the shanks which end portions $g$ are curved outward at a slight curvature or angle to the shanks proper, so as to fully meet the expanded tire and to form a bearing for the same.

The tread portion proper $d$ is preferably made in the shape of a ridge or an obtuse angle so as to offer greater resistance against skidding.

The length of the endless chain can be increased or decreased according to the circumference of the tire by merely adding a greater or less number of shoe sections and links or by removing the same, and the shoe sections can be made of any size, transversely to the circumference of the wheel or in the direction of the circumference, according to the various standard sizes of tires.

Having described my invention what I claim as new and desire to secure by Letters Patent is:—

1. A tire protector, composed of a series of shoe sections substantially V shaped in cross section which shoe sections are provided in each side edge with a notch at the center of the shoe and extending inward from the side edge, a pivot pin extending through each notch near its outer end and links mounted slidably on the pivot pins of two adjacent sections and extending in the direction of the length of the tire protector formed of such alternate link and shoe sections, substantially as set forth.

2. A tire protector, composed of a series of shoe sections substantially V shaped in cross section and links alternating with said sections, which shoe sections are provided in each side edge with a notch extending inward from said side edges at the center of the section, pivot pins extending across said notches and embraced loosely by the links, each shoe section being provided with a central tread section between the inner ends of the two notches in said shoe section, substantially as set forth.

In testimony whereof, I have signed my name to this specification in the presence of two subscribing witnesses.

WILLIAM H. HOFFMANN.

Witnesses:
ALICE J. L. DOLON,
J. N. YOUNG.